(12) United States Patent
Hensler et al.

(10) Patent No.: US 11,431,240 B2
(45) Date of Patent: Aug. 30, 2022

(54) FREQUENCY CONVERTER WITH REDUCED PRE-CHARGING TIME

(71) Applicant: SIEMENS AKTIENGESELLSCHAFT, Munich (DE)

(72) Inventors: Alexander Hensler, Gerhardshofen (DE); Philipp Oschmann, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/290,015

(22) PCT Filed: Sep. 19, 2019

(86) PCT No.: PCT/EP2019/075111
§ 371 (c)(1),
(2) Date: Apr. 29, 2021

(87) PCT Pub. No.: WO2020/088840
PCT Pub. Date: May 7, 2020

(65) Prior Publication Data
US 2022/0006395 A1    Jan. 6, 2022

(30) Foreign Application Priority Data
Oct. 30, 2018   (EP) .................................... 18203375

(51) Int. Cl.
*H02M 1/36* (2007.01)
*H02M 5/458* (2006.01)
(Continued)

(52) U.S. Cl.
CPC ........... *H02M 1/36* (2013.01); *H02M 5/4585* (2013.01); *H02M 1/0064* (2021.05); *H02M 7/05* (2021.05);
(Continued)

(58) Field of Classification Search
CPC .... H02M 1/0064; H02M 1/36; H02M 5/4585; H02M 7/05; H02M 7/062; H02M 7/2173; H02M 7/219
See application file for complete search history.

(56) References Cited

U.S. PATENT DOCUMENTS 9,673,695 B1 *   6/2017   Li ............................ H02M 1/32
9,837,924 B1 * 12/2017   Wei ........................ H02M 7/125
(Continued)

FOREIGN PATENT DOCUMENTS

EP          2533409 A1    12/2012

OTHER PUBLICATIONS

Dehghani Tafti Hossein et al: "Control of active front-end rectifier of the solid-state transformer with improved dynamic performance during precharging". 2017 Asian Conference on Energy, Power and Transportation Electrification (ACEPT), IEEE, pp. 1-6, XP033263691, DOI: 10.1109/ACEPT.2017.8168622; [gefundem am Dec. 5, 2017]; 2017.
(Continued)

*Primary Examiner* — Jue Zhang
(74) *Attorney, Agent, or Firm* — Henry M. Feiereisen LLC

(57) ABSTRACT

A frequency converter includes a rectifier on an input side and a support capacitor downstream of the rectifier. Input-side phases of the rectifier feed the backup capacitor via multiple half-bridges of the rectifier. The half-bridges have active switching elements and the rectifier is designed as a recovery rectifier. The input-side phases are connected to grid-side phases of a multiphase supply grid via an upstream circuit. Each grid-side phase is connected to one of the input-side phases within the upstream circuit via a respective phase capacitor. A control facility controls the active switching elements when a first charge state of the support capaci-
(Continued)

tor is reached and input-side phase voltages are applied to the input-side phases via the active switching elements. Voltages running in the opposite direction to the grid-side phase voltages are applied to the grid-side phases to which the input-side phases are connected via the phase capacitors.

5 Claims, 4 Drawing Sheets

(51) Int. Cl.
    *H02M 7/04*         (2006.01)
    *H02M 7/06*         (2006.01)
    *H02M 7/217*       (2006.01)
    *H02M 7/219*       (2006.01)
    *H02M 1/00*         (2006.01)

(52) U.S. Cl.
    CPC ............ *H02M 7/062* (2013.01); *H02M 7/219* (2013.01); *H02M 7/2173* (2013.01)

(56) References Cited

U.S. PATENT DOCUMENTS

| 2013/0119903 A1* | 5/2013 | Weiss | H02H 9/001 |
| | | | 318/400.3 |
| 2013/0241451 A1* | 9/2013 | Wei | H02M 7/125 |
| | | | 318/400.3 |
| 2014/0117910 A1* | 5/2014 | Le | G01R 31/42 |
| | | | 318/490 |
| 2015/0098257 A1* | 4/2015 | Wei | H05K 7/1432 |
| | | | 363/37 |

OTHER PUBLICATIONS

PCT International Search Report and Written Opinion of International Searching Authority dated Jan. 8, 2020 corresponding to PCT International Application No. PCT/ EP2019/075111 filed Sep. 19, 2019.

\* cited by examiner

FREQUENCY CONVERTER WITH REDUCED PRE-CHARGING TIME

CROSS-REFERENCES TO RELATED APPLICATIONS

This application is the U.S. National Stage of International Application No, PCT/EP2019/075111, filed Sep. 19, 2019, which designated the United States and has been published as international Publication No. WO 2020/088840 A1 and which claims the priority of European Patent Application, Serial No. 18203375.3, filed Oct. 30, 2018, pursuant to 35 U.S.C. 119(a)-(d).

BACKGROUND OF THE INVENTION

The present invention relates to a frequency converter,
wherein the frequency converter has a rectifier on the input side and at least one support capacitor arranged downstream of the rectifier,
wherein the rectifier has multiple half-bridges, via which a respective input side phase of the rectifier feeds the support capacitor,
wherein the half-bridges have active switching elements such that the rectifier is designed as a recovery rectifier,
wherein the input-side phases of the rectifier are connected to grid-side phases of a multiphase supply grid via an upstream circuit,
wherein each grid-side phase is connected to one of the input-side phases within the upstream circuit via a respective phase capacitor.

As a rule, mains-fed frequency converters require both a filter circuit and a pre-charging circuit between the supply grid and the input-side rectifier of the frequency converter. The filter circuit is used to limit network perturbations. The pre-charging circuit is only required when the frequency converter is connected to the supply grid. It is used to limit the pre-charging current with which the support capacitor is charged. As soon as the support capacitor is charged, the current limitation can be terminated. For this purpose, the pre-charging circuit can be bridged, for example, by means of a relay.

A simple and widespread pre-charging circuit consists of arranging one resistor in each case in the lines from the grid-side phases of the supply grid to the input-side phases of the rectifier, which is bridged by means of a switching contact of a relay after the pre-charging of the support capacitor. The disadvantage of this pre-charging circuit is that high power losses occur during pre-charging in the resistors and thus significant heating of the resistors occurs. In particular, in cases in which the capacitance of the support capacitor is large, the resistors must also be designed to be voluminous. Alternatively, the resistance values can also be selected to be relatively large. In this case, however, the time required for pre-charging increases. Furthermore, repeated pre-charging is often only possible to a limited extent as the resistors require a relatively long time to cool down again.

It is alternatively known to use dedicated power semiconductors for pre-charging the support capacitor. However, this procedure is complicated and costly in terms of circuitry.

A frequency converter of the type mentioned at the beginning is known from EP 2 533 409 A1. In these frequency converters, switches are also arranged in the lines in which the phase capacitors are arranged. The phase capacitors are therefore not used for filtering, but rather to limit the charging current. In addition, filter capacitors are present which are arranged between two of the grid-side or input-side phases in each case.

The frequency converter known from EP 2 533 409 A1 is advantageous in this respect, compared to the frequency converters of the conventional prior art, because only low power losses occur during pre-charging. However, the total volume is still large because both the pre-charging circuit and the filter circuit are required. Accordingly, the costs are also still high. Furthermore, a relatively long time is required for pre-charging of the support capacitor.

A frequency converter is known from the scientific paper "Control of Active Front-End Rectifier of the Solid-State Transformer with Improved Dynamic Performance during Recharging" by H. D. Tafti et al., which has a rectifier on the input side and a support capacitor arranged downstream of the rectifier. The rectifier has half-bridges via which input-side phases of the rectifier feed the support capacitor. The half-bridges have active switching elements such that the rectifier is designed as a recovery rectifier. The input-side phases of the rectifier are connected to grid-side phases of a supply grid via an upstream circuit. The frequency converter has a control facility which controls the active switching elements when a first charge state of the support capacitor is reached, such that the support capacitor is further charged at a constant charging rate.

The object of the present invention is to design a frequency converter of the type mentioned at the beginning in such a way that pre-charging can take place in a relatively short time.

SUMMARY OF THE INVENTION

The object is achieved by a frequency converter as set forth hereinafter. Advantageous embodiments of the frequency converter are the subject of the dependent claims.

According to the invention, a frequency converter of the type mentioned at the beginning is designed such that the frequency converter has a control facility which controls the active switching elements when a first charge state of the support capacitor is reached such that input-side phase voltages are applied to the input-side phases via the active switching elements, said voltages running in the opposite direction to the grid-side phase voltages applied to the grid-side phases to which the input-side phases are connected via the phase capacitors.

As a result, the effective potential differences on the two sides of the phase capacitors can be increased so that the phase capacitors deliver more charge to the support capacitor per period of mains voltage.

In a preferred embodiment, it is provided that
the grid-side phases within the upstream circuit are additionally connected directly to another of the input-side phases via a respective switch such that the grid-side phases are short-circuited with the input-side phases when the switches are closed and the phase capacitors each connect two grid-side phases or two input-side phases to one another, and
the control facility holds the switches open when the support capacitor is pre-charged, and closes said switches when a predetermined second charge state of the support capacitor assumed during the pre-charging of the support capacitor after the first charge state is reached.

As a result, in a simple manner, one and the same capacitors—namely the phase capacitors—can, on the one hand, implement the current limitation during pre-charging and, on the other hand, act as filter capacitors for current filtering during normal operation.

The interchanging of the interconnected grid-side and input-side phases does not pose a major problem. In particular, the control of the active switching elements can be simply adapted accordingly by the control facility. This is because only the assignment of the individual control signals to the active switching elements must be adapted. The control as such can remain unchanged.

In this case, the frequency converter is preferably designed in such a way that, on reaching the predetermined second charge state, the control facility first controls the active switching elements in such a way that input-side phase voltages are applied to the input-side phases via the active switching elements, which phase voltages correspond in amplitude and phase to those grid-side phase voltages which are applied to those grid-side phases to which the input-side phases are connected via the phase capacitors, then controls the active switching elements in such a way that the input-side phase voltages applied to the input-side phases via the active switching elements are continuously converted into those grid-side phase voltages which are applied to those grid-side phases to which the input-side phases are connected via the switches, and only closes the switches after the input-side phase voltages have been converted into those grid-side phase voltages which are applied to those grid-side phases to which the input-side phases are connected via the switches.

As a result, it is possible to significantly reduce current peaks and voltage jumps which might otherwise occur when the switches are closed.

The pre-charging circuit preferably has Inductances in lines to the grid-side phases and/or to the input-side phases. This embodiment enables particularly simple and effective filtering.

The inductances are preferably arranged in the lines in such a way that they are flowed through by the phase currents fed from the supply grid and/or flowing via the half-bridges when the switches are open and when the switches are closed. As a result, the implementation of the combination of the two effects of the phase capacitors—namely one for filtering and one for current limitation—is particularly simple and effective.

BRIEF DESCRIPTION OF THE DRAWING

The properties, features and advantages of this invention described above and the manner in which these are achieved will become clearer and more readily comprehensible in connection with the following description of the exemplary embodiments, which are explained in more detail with reference to the diagrams. Here shown in a diagrammatic view.

DETAILED DESCRIPTION OF PREFERRED EMBODIMENTS

Figure 1:
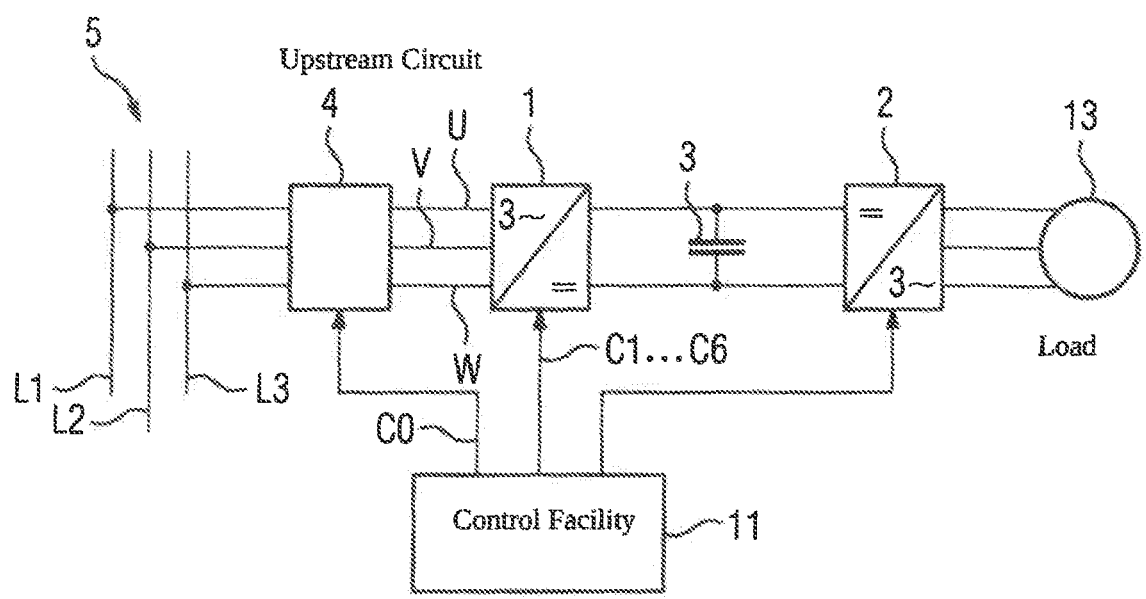
FIG. 1 A frequency converter.

According to FIG. 1, a frequency converter has a rectifier 1 on the input side. A further facility 2 is arranged downstream of the rectifier 1 on the output side. Furthermore, the frequency converter has at least one support capacitor 3 which is arranged between the rectifier 1 and the further facility 2. The further facility is often designed as an inverter. In this case, it is referred to as a DC link converter. However, the further facility can also be designed in a different manner, for example, as a DC consumer, as a DC power supply, as a photovoltaic system or as an energy store.

On the input side, the rectifier 1 has phases U, V, W, which are connected to phases L1, L2, L3 of a supply grid 5 via an upstream circuit 4. Both the rectifier 1 and the supply grid 5 are thus multiphase, that is to say, in each case have a plurality of phases U, V, W or L1, L2, L3. The phases U, V, W of the rectifier 1 are referred to hereinafter as input-side phases U, V, W for the purpose of linguistic distinction from the phases L1, L2, L3 of the supply grid 5. Likewise, for the purpose of linguistic distinction from the input-side phases U, V, W of the rectifier 1, the phases L1, L2, L3 of the supply grid 5 are referred to as grid-side phases L1, L2, L3.

As a rule, the number of input-side phases U, V, W is three. Regardless of the number of input-side phases U, V, W, however, the number of input-side phases U, V, W is equal to the number of grid-side phases L1, L2, L3.

It is possible that the grid-side phase L1 leads the grid-side phase L2 by 120° electrically and likewise the grid-side phase L2 leads the grid-side phase L3 by 120° electrically and the grid-side phase L3 leads the grid-side phase L1 by 120° electrically. Preferably, however, it is the other way round so that the grid-side phase L1 lags behind the grid-side phase L2 by 120° electrically and likewise the grid-side phase L2 lags behind the grid-side phase L3 by 120° electrically and the grid-side phase L3 lags behind the grid-side phase L1 by 120° electrically.

Figure 2:
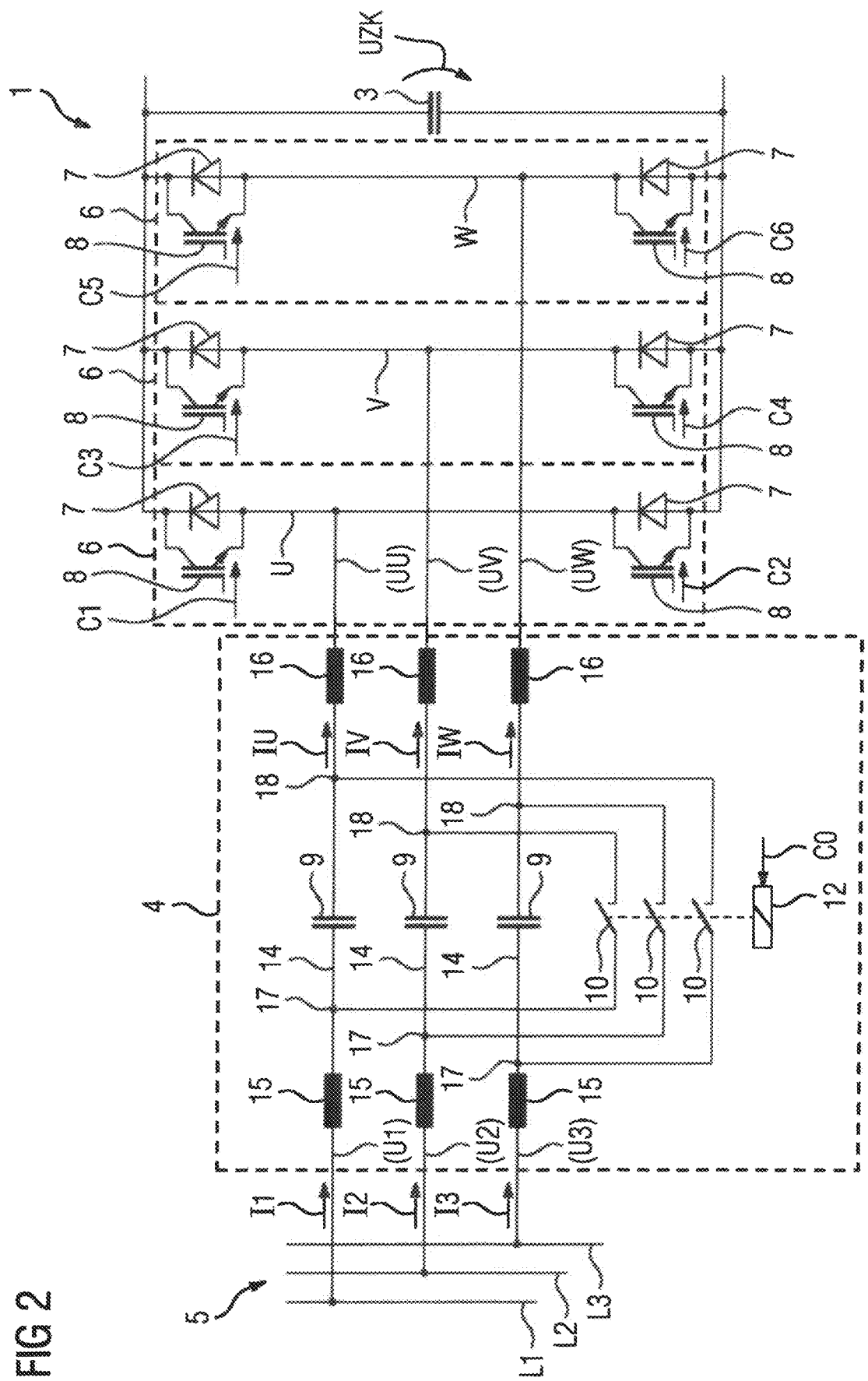
FIG. 2 A network connection, an upstream circuit, and an input-side rectifier, FIG. 3 A flow chart, FIG. 4 A time diagram, and FIG. 5 A further time diagram.

As shown in FIG. 2, the rectifier 1 has a plurality of half-bridges 6. In each case, one of the input-side phases U, V, W of the rectifier 1 feeds the support capacitor 3 via each of the half-bridges 6. As shown in FIG. 2, the half-bridges 6 have diodes 7. Furthermore, they have active switching elements 8 connected in parallel with the diodes 7. The switching elements 8 are electronic semiconductor switches, for example MOSFETs. The rectifier 1 can be fed back due to the active switching elements 8. They are controlled via corresponding control signals C1 to C6. It is possible for the diodes 7 to be independent components. Alternatively, it is possible for the diodes 7 to be integrated components of the active switching elements 8.

Figure 5:
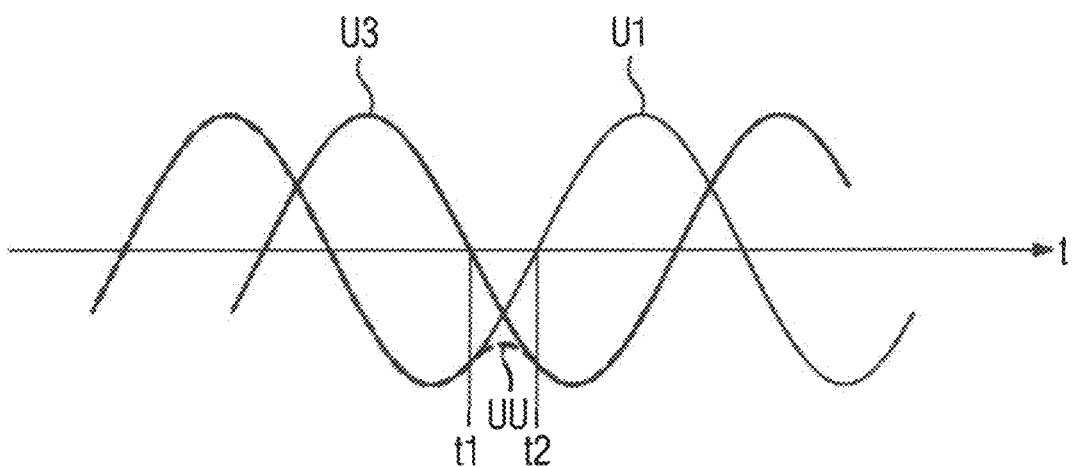

As shown in FIG. 2, the grid-side phase L1, L2, L3 are connected to one of the input-side phases U, V, W within the upstream circuit 4 via a respective capacitor 9. Specifically, the grid-side phase L1 is connected to the input-side phase U via one of the capacitors 9 in each case, the grid-side phase L2 is connected to the input-side phase V and the grid-side phase L3 is connected to the input-side phase W. However, other embodiments are also possible. In particular, the upstream circuit 4 can also be designed as shown in FIG. 5 of EP 2 533 409 A1. Hereinafter, the capacitors 9 are referred to as phase capacitors 9 for the purpose of linguistic distinction from the support capacitor 3.

Furthermore, the grid-side phases L1, L2, L3 within the upstream circuit 4 are each connected to one of the input-side phases U, V, W via a respective switch 10. As shown in FIG. 2, each of the grid-side phases L1, L2, L3—in relation to the input-side phases U, V, W, to which the grid-side phases L1, L2, L3 are connected via the phase capacitors 9—is preferably connected to another of the input-side phases U, V, W via one of the switches 10 in each case. Specifically, the grid-side phase L1 is connected to the input-side phase V via one of the switches 10 in each case, the grid-side phase L2 is connected to the input-side phase W and the grid-side phase L3 is connected to the input-side phase U, The connection of the grid-side phase L1 to the input-side phase V, the grid-side phase L2 to the input-side phase W and the grid-side phase L3 to the input-side phase U is direct. When the switches 10 are closed, the grid-side phases L1, L2, L3 are therefore short-circuited to the input-side phases U, V, W. In the case of the embodiment according to FIG. 2, the phase capacitors 9 each connect two grid-side phases L1, L2, L3 or two input-side phases U, V, W to one another. In particular, the following are preferably connected via one of the phase capacitors 9 in each case:

the grid-side phase L1 and the input-side phase V (which in this case are short-circuited to one another via one of the switches 10) to the grid-side phase L2 and the input side phase W (which in this case are short-circuited to one another via another of the switches 10), the grid-side phase L1 and the input-side phase V to the grid-side phase L3 and the input-side phase U (which in this case are also short-circuited to one another via another of the switches 10) and the grid-side phase L2 and the input-side phase W to the grid-side phase L3 and the input-side phase U.

According to FIG. 1, the frequency converter also has a control facility 11. In particular, the control facility 11 generates the control signals C1 to C6. Furthermore, when the support capacitor 3 is pre-charged, the control facility 11 holds the switches 10 open. As a result, the support capacitor 3 is slowly charged via the phase capacitors 9. The switches 10 can be kept in the open state, for example, in that a relay 12, which activates the switches 10, is not supplied with current by the control facility 11. However, at a later time the control facility 11 closes the switches 10. A corresponding control signal, for example for the relay 12, is referred to in FIG. 2 by C0. In this state—i.e. when the switches 10 are closed—the frequency converter operates normally. In normal operation, the further facility 2 is also controlled by the control facility 11 in particular. For example, as shown in FIG. 1, a load 13 can be supplied with electrical energy via an inverter. Said state can, for example, be defined in that a support voltage UZK dropping off across the support capacitor 3 has reached a predetermined percentage of its set point, for example, at least 90%.

In FIGS. 1 and 2—in particular in FIG. 2—a number of advantageous embodiments are also shown. In particular, the upstream circuit 4 can have inductances 15 in lines 14 to the grid-side phases L1, L2, L3. If the inductances 15 are present, they are preferably arranged in the lines 14 in such a way that they are flowed through by the phase currents I1, I2, I3 (grid-side phase currents I1, I2, I3) fed from the supply grid 5 both when the switches 10 are open and when the switches 10 are closed. Alternatively, or additionally, the upstream circuit 4 can have inductances 16 in the lines 14 to the input-side phases U, V, W. If the inductances 16 are present, they are preferably arranged in the lines 14 in such a way that they are flowed through by the phase currents IU, IV, IW (input-side phase currents IU, IV, IW) flowing via the half-bridges 6 both when the switches 10 are open and when the switches 10 are closed. Node points 17, 18, at which the switches 10 are connected to the lines 14 are therefore arranged between the phase capacitors 9 and the inductances 15, 16.

Figure 3:
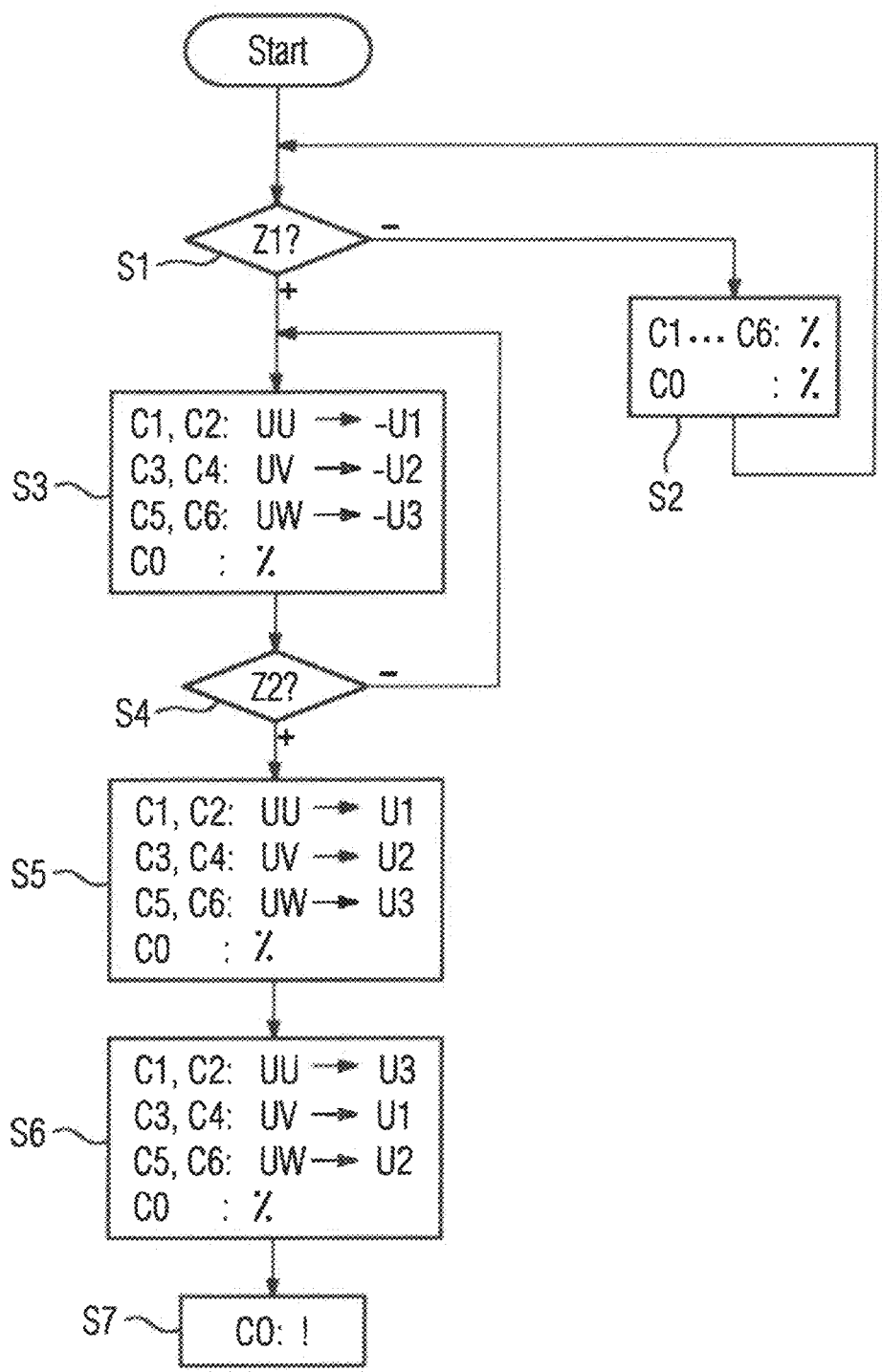

The mode of operation of the frequency converter is explained hereinafter in connection with FIG. 3. In this context, two further advantageous embodiments are also explained. These embodiments are based on one another. However, they can be implemented independently of whether inductances 15, 16 are arranged in the lines 14 or not.

Firstly, the basic design according to the invention is explained.

According to FIG. 3, when the rectifier 1 is connected to the supply grid 5, the control facility 11 checks in a step S1 whether the support capacitor 3 reaches a charge state Z1, hereinafter referred to as the first charge state Z1. In particular, in step S1, the control facility 11 can check whether the support voltage UZK reaches or exceeds a suitable, predetermined value, for example a value between 30% and 70%, in particular 40% to 60%, of the set point of the support voltage UZK.

As long as this is not the case, the control facility 11 returns to step S1 via a step S2. In step S2, the control facility 11 holds both the switches 10 and the active switching elements 8 open. This is indicated in FIG. 3 in that no output (indicated by the symbol "./.") of the control signals C0 to C6 takes place.

Figure 4:
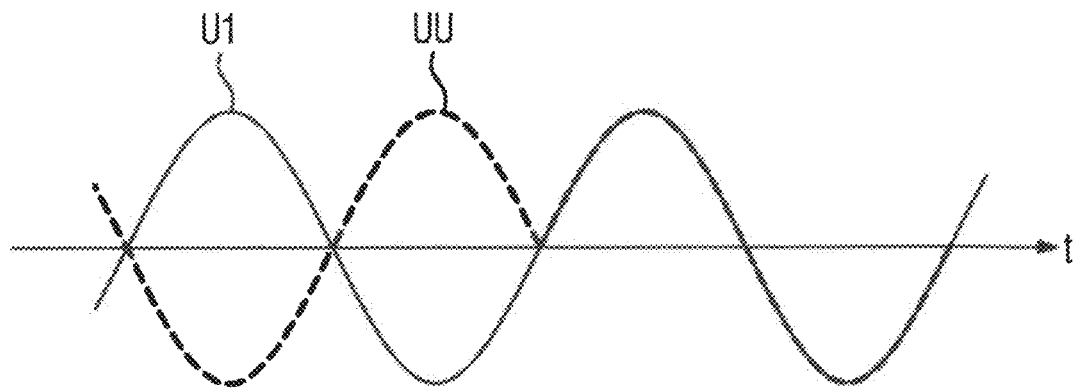

When the support capacitor 3 reaches the first charge state Z1, the control facility 11 controls the active switching elements 8 in a step S3. The activation is such that an input-side phase voltage UU is supplied to the corresponding phase capacitor 9 via the active switching elements 8 via which the input-side phase U is switched, which phase voltage UU runs in the opposite direction (opposite phase) to the grid-side phase voltage U1. In the left area, FIG. 4 shows the associated curve of the grid-side phase voltage U1 and the input-side phase voltage UU as a function of time t.

In an analogous manner, the control facility 11 controls the active switching elements 8, via which the input-side phase V is switched, in such a way that an input-side phase voltage UV is supplied to the corresponding phase capacitor 9, which phase voltage runs in the opposite direction (opposite phase) to the grid-side phase voltage U2. Likewise, the control facility 11 controls the active switching elements 8 via which the input-side phase W is switched in such a way that an input-side phase voltage UW is supplied to the corresponding phase capacitor 9, which phase capacitor runs in the opposite direction (opposite phase) to the grid-side phase voltage U3. As a result, a relatively large potential difference is present at the phase capacitors 9 so that relatively large phase currents I1, I2, I3, IU, IV, IW flow in the lines 14. As a result, the support capacitor 3 is rapidly charged. As the grid side phase voltages U1, U2, U3 change over time, the input-side phase voltages UU, UV, UW also change. The activation of the active switching elements 8 must satisfy these conditions. However, the corresponding determination of the activation of the active switching elements 8 is generally known to those skilled in the art and therefore need not be explained in detail.

During the pre-charging of the support capacitor 3, a second charge state Z2 is assumed, but only after the first charge state Z1. As already mentioned, the second charge state Z2 can be defined, for example, in that the support voltage UZK dropping across the support capacitor 3 has reached a predetermined percentage of its set point, for example, at least 90. In a step S4, the control facility 11 therefore checks whether the support capacitor 3 reaches the second charge state Z2. As long as this is not the case, the control facility 11 returns to step S3.

When the second charge state Z2 is reached, the basic principle of the present invention is concluded. If the second charge state Z2 is determined accordingly—in particular, the support voltage UZK dropping across the support capacitor 3 has reached a sufficiently high percentage of its set point—and the upstream circuit 4 is designed accordingly, normal operation can commence directly (see later, a step S7). However, FIG. 2 also shows two advantageous embodiments. These are explained in combination hereinafter. This is done because the two embodiments are based on one another. In particular, they relate to measures which are taken shortly before and immediately before the closure of the switches 10.

In this case, the second charge state Z2 only corresponds to a partial charge of the support capacitor 3. For example, as already mentioned, it may be required that the support voltage UZK dropping across the support capacitor 3 has reached a predetermined percentage of its set point, for example, at least 90%.

In the context of this advantageous embodiment, the control facility 11 does not yet close the switch 10 immediately, but instead proceeds to a step S5 first. In step S5, the control facility 11 controls the active switching elements 8 for the phase U in such a way that an input-side phase voltage UU, which corresponds in amplitude and phase to the grid-side phase voltage U1, is applied to the input-side phase U via the associated active switching elements 8. The right area in FIG. 4 shows the associated curve of the phase voltage U1 and the phase voltage UU as a function of time t. The left area in FIG. 5 likewise shows the associated curve of the phase voltage U1 and the phase voltage UU as a function of time t.

At the same time, FIG. 4 also shows the manner in which the switchover from the opposite curve (left area) to the in-phase curve (right area) takes place. This is because, as shown in FIG. 4, the switchover preferably takes place at a zero crossing of the phase voltages U1, UU.

Similarly, in step S5, the phase voltage UV of the input-side phase V is also switched from a curve which runs in the opposite direction to the curve of the phase voltage U2 to one that is in the same phase as the curve of the phase voltage U2. The same applies to the switchover of the phase voltage UW of the input-side phase W from a curve running in the opposite direction to the curve of the phase voltage U3 to a curve in the same phase as the curve of the phase voltage U3.

Then, in a step S6, the control facility 11 controls the active switching elements 8 for the phase U in such a way that an input-side phase voltage UU is applied to the input-side phase U via the associated active switching elements 8, which phase voltage UU corresponds in amplitude and phase to the grid-side phase voltage U3. In this case, as shown in FIG. 5, a continuous transfer takes place. This can be achieved, for example, by keeping a determined voltage value of the input-side phase voltage UU constant from a time t1, as shown in FIG. 5, until the grid-side phase voltage U3 reaches this determined voltage value at a time t2. Once the determined voltage value is reached, the phase voltage UU then follows the grid-side phase voltage U3.

In a similar manner, in step S6, the phase voltage UV of the input-side phase V is also switched from a curve in the same phase as the curve of the phase voltage U2 to a curve in the same phase as the curve of the phase voltage U1. The same applies to the switchover of the phase voltage UW of the input-side phase W from a curve in the same phase as the curve of the phase voltage U3 to a curve in the same phase as the curve of the phase voltage U2.

It is possible to carry out the transfer of the phase voltages UU, UV, UW just explained simultaneously. In particular, in this case it is advantageous if the grid-side phase L1 of the grid-side phase L2 lags electrically by 120° and likewise the grid-side phase L2 of the grid-side phase L3 lags electrically by 120° and the grid-side phase L3 of the grid-side phase L1 lags electrically by 120°. This is because the respective input-side phase voltage UU, UV, UW must only be kept at a constant value for one third of a period of the grid-side phase voltages U1, U2, U3. Otherwise, the input-side phase voltages UU, UV, UW would have to be kept at a constant value for two thirds of a period of the grid-side phase voltages U1, U2, U3.

The individual input-side phases U, V, W can be controlled independently of one another via the corresponding half-bridges 6. It is therefore alternatively possible to carry out the transfer of the phase voltages UU, UV, UW just explained one after the other. In this case, it is even possible to carry out a direct, immediate (abrupt) switchover of the input-side phase voltages UU, UV, UW from a curve in the same phase as one of the grid-side phase voltages U1, U2, U3 to a curve in the same phase as another of the grid-side phase voltages U1, U2, U3 without causing a voltage jump and thus to continue carrying out the switchover as before. In this case, however, for example for phase U, the switchover must take place at a time at which the grid-side phase voltages U1 and U3 have the same value. Similarly, in this case the switchover for phase V must take place at a time at which the grid-side phase voltages U1 and U2 have the same value. Likewise, in this case the switchover for phase W must take place at a time at which the grid-side phase voltages U2 and U3 have the same value.

After the transfer of the phase voltages UU, UV, UW explained above, the control facility 11 closes the switches 10 in a step S7. The switches 10 should be closed as soon as possible after the time t2. When the switches 10 are closed, the pre-charging of the support capacitor 3 and thus of the frequency converter as a whole is completed. Normal operation follows, in which the further facility 2 is operated in the usual manner. To close the switches 10, the control facility 11 can, for example, control the relay 12 in such a way that the switches 10 are closed.

In summary, the present invention thus relates to the following facts:

A frequency converter has a rectifier 1 on the input side and at least one support capacitor 3 arranged downstream of the rectifier 1. The rectifier 1 has multiple half-bridges 6 via which a respective input side-phase U, V, W of the rectifier 1 feeds the support capacitor 3. The half-bridges 6 have active switching elements 8 such that the rectifier 1 is designed as a recovery rectifier. The input-side phases U, V, W are connected to grid-side phases L1, L2, L3 of a multiphase supply grid 5 via an upstream circuit 4. Each grid-side phase L1, L2, L3 is connected to one of the input-side phases U, V, W within the upstream circuit 4 via a respective phase capacitor 9. A control facility 11 of the frequency converter controls the active switching elements 8 when a first charge state Z1 of the support capacitor 3 is reached such that input-side phase voltages UU, UV, UW are applied to the input-side phases U, V, W via the active switching elements 8, said voltages running in the opposite direction to the grid-side phase voltages U1, U2, U3 applied to the grid-side phases L1, L2, L3 to which the input-side phases U, V, W are connected via the phase capacitors 9.

The present invention has many advantages. In particular, rapid and low-loss pre-charging of the support capacitor 3 is possible. Furthermore, the upstream circuit 4 is significantly simplified. In particular, pre-charging resistors and pre-charging capacitors required there can be pared down compared with the prior art. The frequency converter according to the invention can therefore be realized considerably more cost-effectively than the frequency converter of the prior art.

In particular, the costs of the upstream circuit 4 can be reduced by more than 50% compared with the prior art. The capacitance values required for the phase capacitors 9 can be adjusted in such a way that both rapid pre-charging and good filtering result.

Although the invention has been illustrated and described in detail by the preferred exemplary embodiment, the invention is not limited by the disclosed examples and other variations can be derived therefrom by a person skilled in the art without departing from the scope of the invention.

What is claimed is:

1. A frequency converter, comprising:
    a rectifier on an input side, said rectifier comprising input side phases and half bridges, said half bridges including active switching elements to configured the rectifier as a recovery rectifier;
    a support capacitor arranged downstream of the rectifier and fed by the half bridges of the rectifier via the input side phases;
    an upstream circuit connecting the input side phases of the rectifier via phase capacitors to grid side phases of a multiphase supply grid, with each grid side phase being connected to one of the input side phases within the upstream circuit via a respective phase capacitor; and
    a control facility configured to control the active switching elements when a first charge state of the support capacitor is reached to apply input side phase voltages to the input side phases via the active switching elements, said input side phase voltages running in an opposite direction to grid side phase voltages applied to the grid side phases to which the input side phases are connected via the phase capacitors.

2. The frequency converter of claim 1, wherein the grid-side phases within the upstream circuit are directly connected to another of the input-side phases via a respective switch such that the grid-side phases are short-circuited to the input-side phases when the switches are closed, and the phase capacitors each connect two grid-side phases or two input-side phases to one another; said control facility configured to hold the switches open when the support capacitor is being pre-charged, and to close the switches when a predetermined second charge state of the support capacitor is reached, which is assumed during the pre-charging of the support capacitor after the first charge state.

3. The frequency converter of claim 2, wherein the control facility is configured to:
    when the predetermined second charge state is reached, first control the active switching elements such that input side phase voltages are applied to the input-side phases via the active switching elements, the input side phase voltages correspond in amplitude and phase to those grid-side phase voltages which are applied to those grid-side phases to which the input-side phases are connected via the phase capacitors,
    then control the active switching elements such that the input-side phase voltages applied to the input-side phases via the active switching elements are continuously converted into those grid-side phase voltages which are applied to those grid-side phases to which the input-side phases are connected via the switches, and
    only close the switches after the input-side phase voltages have been converted into those grid-side phase voltages which are applied to those grid-side phases to which the input-side phases are connected via the switches.

4. The frequency converter of claim 3, wherein the upstream circuit includes inductances in lines to the grid-side phases and/or to the input-side phases.

5. The frequency converter of claim 4, wherein the inductances are arranged in the lines such that phase currents fed from the supply grid and/or flowing via the half-bridges flow through the inductances both when the switches are open and when the switches are closed.

* * * * *